(12) United States Patent
Kim et al.

(10) Patent No.: US 12,056,616 B2
(45) Date of Patent: Aug. 6, 2024

(54) METHOD FOR PROCESSING IMAGE, AND APPARATUS THEREFOR

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Kyungsu Kim, Suwon-si (KR); Chang Dong Yoo, Daejeon (KR); Junyeong Kim, Daejeon (KR); Minuk Ma, Daejeon (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 361 days.

(21) Appl. No.: 17/427,471

(22) PCT Filed: Jan. 30, 2020

(86) PCT No.: PCT/KR2020/001401
§ 371 (c)(1),
(2) Date: Jul. 30, 2021

(87) PCT Pub. No.: WO2020/159241
PCT Pub. Date: Aug. 6, 2020

(65) Prior Publication Data
US 2022/0114836 A1    Apr. 14, 2022

Related U.S. Application Data

(60) Provisional application No. 62/798,672, filed on Jan. 30, 2019.

(30) Foreign Application Priority Data

May 22, 2019   (KR) .................. 10-2019-0060230

(51) Int. Cl.
*G06K 9/00*        (2022.01)
*G06N 3/08*        (2023.01)
(Continued)

(52) U.S. Cl.
CPC ............... *G06N 3/084* (2013.01); *G06N 3/08* (2013.01); *G06V 10/766* (2022.01);
(Continued)

(58) Field of Classification Search
CPC ...... G06N 3/08; G06V 10/774; G06V 10/776; G06V 10/82; G06V 40/165; G06V 40/171
See application file for complete search history.

(56) References Cited

U.S. PATENT DOCUMENTS 9,922,237 B2 *   3/2018   Li ..................... G06V 40/172
10,074,008 B2 *  9/2018   Musial ............... G06V 40/172
(Continued)

FOREIGN PATENT DOCUMENTS

CN    105981075 A  *  9/2016   ......... G06K 9/00261
CN    107194341 A  *  9/2017   ......... G06K 9/00228
(Continued)

OTHER PUBLICATIONS

One Millisecond Face Alignment with an Ensemble of Regression Trees, Vahid Kazemi et al., CVF, 2014, pp. 1-8 (Year: 2014).*
(Continued)

*Primary Examiner* — Jayesh A Patel
(74) *Attorney, Agent, or Firm* — Sughrue Mion, PLLC

(57) ABSTRACT

Provided are an artificial intelligence (AI) system using a machine learning algorithm such as deep learning, and applications thereof. A method, performed by an electronic
(Continued)

apparatus, of processing images includes obtaining a plurality of training image sets corresponding to a plurality of types of target objects, wherein training images in the training image sets are labeled with feature points forming a preset structure, generating a first artificial intelligence (AI) model for determining a standard structure based on the labeled feature points, by using the training images in the training image sets, identifying a face in a training image transformed based on the standard structure, and training a second AI model for verifying the first AI model, based on an image regressed from the transformed training image, and the training image before being transformed.

16 Claims, 11 Drawing Sheets

(51) Int. Cl.
| | | |
|---|---|---|
| G06N 3/084 | (2023.01) | |
| G06V 10/766 | (2022.01) | |
| G06V 10/774 | (2022.01) | |
| G06V 10/776 | (2022.01) | |
| G06V 10/82 | (2022.01) | |
| G06V 40/16 | (2022.01) | |

(52) U.S. Cl.
CPC .......... *G06V 10/774* (2022.01); *G06V 10/776* (2022.01); *G06V 10/82* (2022.01); *G06V 40/165* (2022.01); *G06V 40/171* (2022.01)

(56) References Cited

U.S. PATENT DOCUMENTS

| | | | | |
|---|---|---|---|---|
| 10,095,917 | B2* | 10/2018 | Taigman | G06N 3/045 |
| 10,796,480 | B2* | 10/2020 | Chen | G06V 40/166 |
| 10,963,676 | B2* | 3/2021 | Wang | G06V 10/764 |
| 11,042,728 | B2* | 6/2021 | Han | G06V 10/82 |
| 2003/0108244 | A1* | 6/2003 | Li | G06V 40/161 |
| | | | | 382/227 |
| 2008/0187213 | A1* | 8/2008 | Zhang | G06V 40/171 |
| | | | | 382/159 |
| 2011/0142355 | A1* | 6/2011 | Li | G06V 40/165 |
| | | | | 382/224 |
| 2015/0169938 | A1* | 6/2015 | Yao | G06V 40/176 |
| | | | | 382/103 |
| 2018/0012386 | A1* | 1/2018 | Kemelmaher | G06F 16/58 |
| 2019/0114824 | A1* | 4/2019 | Martinez | G06T 15/205 |
| 2019/0228658 | A1* | 7/2019 | Huang | G06T 7/97 |

FOREIGN PATENT DOCUMENTS

| | | | | |
|---|---|---|---|---|
| JP | 6248178 B2 * | 12/2017 | | G06K 9/00228 |
| JP | 6248178 B2 | 12/2017 | | |
| KR | 10-2003-0073879 A | 9/2003 | | |
| KR | 1020030073879 * | 9/2003 | | |
| KR | 10-1254181 B1 | 4/2013 | | |
| KR | 10-2018-0074556 A | 7/2018 | | |
| KR | 10-2018-0074565 A | 7/2018 | | |
| KR | 1020180074565 * | 7/2018 | | |
| KR | 10-2161359 B1 | 9/2020 | | |
| WO | WO-2015015173 A1 * | 2/2015 | | G06K 9/00248 |

OTHER PUBLICATIONS

Stacked Dense U-Nets with Dual Transformers for Robust Face Alignment, Jia Guo et al., arXiv, 2018, pp. 1-13 (Year: 2018).*
Spatial Transformer Introspective Neural Network, Yunhan Zhao et al., arXiv, 2018, pp. 1-13 (Year: 2018).*
Model-Agnostic Meta-Learning for Fast Adaptation of Deep Networks, Chelsea Finn et al., arXiv, 2017, pp. 1-13 (Year: 2017).*
Interspecies Knowledge Transfer for Facial Keypoint Detection, Maheen Rashid et al., Apr. 2017, pp. 1-10 (Year: 2017).*
International Search Report (PCT/ISA/210) and Written Opinion (PCT/ISA/237) issued by the International Searching Authority in International Application No. PCT/KR2020/001401, issued on May 11, 2020.
Maheen Rashid et al., "Interspecies Knowledge Transfer for Facial Keypoint Detection", Apr. 2017, pp. 1-10 (10 pages total).
Chelsea Finn et al., "Model-Agnostic Meta-Learning for Fast Adaptation of Deep Networks", Jul. 18, 2017, pp. 1-13 (13 pages total).
Yunhan Zhao et al., "Spatial Transformer Introspective Neural Network", May 16, 2018, pp. 1-13 (13 pages total).

* cited by examiner

METHOD FOR PROCESSING IMAGE, AND APPARATUS THEREFOR

CROSS-REFERENCE TO THE RELATED APPLICATION

This application is a National Stage Entry of International Application Serial No. PCT/KR2020/001401, filed Jan. 30, 2020, which is based on and claims priority to U.S. Provisional Application No. 62/798,672, filed Jan. 30, 2019, and Korean Patent Application No. 10-2019-0060230 filed on May 22, 2019, the disclosures of which are incorporated herein in their entirety by reference.

BACKGROUND

1. Field

The disclosure relates to a method of processing images and an apparatus therefor, and more particularly, to a method of extracting a face of a target object by transforming images including the target object to a standard structure, and an apparatus therefor.

2. Description of the Related Art

Unlike existing rule-based smart systems, artificial intelligence (AI) systems refer to systems in which a machine autonomously learns, makes decisions, and becomes smarter. Because a recognition rate is increased and user preferences are more accurately understood in proportion to the number of iterations of the AI systems, the existing rule-based smart systems are being gradually replaced by deep-learning-based AI systems.

AI technology includes machine learning (e.g., deep learning), and element technologies using machine learning.

Machine learning is an algorithm technology for autonomously classifying/learning features of input data, and the element technologies are technologies using the machine learning algorithm of deep learning or the like, and include linguistic understanding, visual understanding, reasoning/prediction, knowledge representation, operation control, etc.

Various fields using AI technology are as described below. Linguistic understanding is a technology for recognizing and applying/processing human languages/characters, and includes natural language processing, machine translation, dialog systems, queries and responses, speech recognition/synthesis, etc. Visual understanding is a technology for recognizing and processing objects like human vision, and includes object recognition, object tracking, image search, human recognition, scene understanding, space understanding, image enhancement, etc. Reasoning/prediction is a technology for judging and logically inferring and predicting information, and includes knowledge/probability-based reasoning, optimization prediction, preference-based planning, recommendation, etc. Knowledge representation is a technology for automating human experience information into knowledge data, and includes knowledge construction (e.g., data generation/classification), knowledge management (data utilization), etc. Operation control is a technology for controlling autonomous driving of vehicles or motion of robots, and includes motion control (e.g., navigation, collision avoidance, and driving control), manipulation control (e.g., action control), etc. The disclosure is not limited to the technologies described above, and as such, the novel aspect of the disclosure may be applied to other technologies.

Meanwhile, due to the development of multimedia and network technologies, users may obtain images, process images, and use the obtained and processed images by using various devices. The obtained images may be used for face recognition, and a technology for recognizing faces in images may be utilized in various fields.

In the face recognition technology, a number of pieces of image data labeled with feature points of a target object may be trained to extract a face of the target object therefrom. In this case, the number of pieces of image data required to recognize the face of the target object is greater than or equal to a certain number. In addition, to recognize a face of a target object different from the trained target object, a certain or greater number of pieces of image data including the face of the different target object are required. Therefore, a technology for recognizing a face of a target object by using a smaller number of pieces of image data is required to increase face recognition speed and data efficiency.

SUMMARY

Provided are a method of processing images to recognize a face of a target object included in the images, and an apparatus therefor.

Provided are a method of processing images to transform the images to a common standard structure, based on a structure formed by eyes and a nose of a target object, and an apparatus therefor.

Provided are a method of processing target images including a different target object to extract a face therefrom based on training images including target objects, and an apparatus therefor.

According to an aspect of the disclosure, there is provided a method for processing images comprising: obtaining a first image comprising a first target object of a first type; transforming the first image into a second image based on a standard structure by applying the first image to a first artificial intelligence model, wherein the first AI model being generated to determine the standard structure based on the labeled feature points in each of a plurality of training images in the training image sets, and wherein each of the plurality of training images has a second target object having a second typr different from the first type; extracting a face of the first target object from the second image; and verifying the face extracted based on the first AI model, by inputting the first image and the second image to a second AI model.

The second AI model may perform a regression operation on the second image before verifying the face extracted based on the first AI model.

According to an embodiment of the disclosure a method, performed by an electronic apparatus, of processing images includes obtaining a plurality of training image sets corresponding to a plurality of types of target objects, wherein training images in the training image sets are labeled with feature points forming a preset structure, generating a first artificial intelligence (AI) model for determining a standard structure based on the labeled feature points, by using the training images in the training image sets, identifying a face in a training image transformed based on the standard structure, and training a second AI model for verifying the first AI model, based on an image regressed from the transformed training image, and the training image before being transformed.

According to another embodiment of the disclosure, an electronic apparatus for processing images includes a communicator, a memory storing one or more instructions, and a processor configured to control the electronic apparatus by executing the one or more instructions, wherein the processor is further configured to obtain a plurality of training image sets corresponding to a plurality of types of target objects, wherein training images in the training image sets are labeled with feature points forming a preset structure, generate a first artificial intelligence (AI) model for determining a standard structure based on the labeled feature points, by using the training images in the training image sets, identify a face in a training image transformed based on the standard structure, and train a second AI model for verifying the first AI model, based on an image regressed from the transformed training image, and the training image before being transformed.

According to another embodiment of the disclosure, a computer program includes a recording medium storing programs executed to obtain a plurality of training image sets corresponding to a plurality of types of target objects, wherein training images in the training image sets are labeled with feature points forming a preset structure, generate a first artificial intelligence (AI) model for determining a standard structure based on the labeled feature points, by using the training images in the training image sets, identify a face in a training image transformed based on the standard structure, and train a second AI model for verifying the first AI model, based on an image regressed from the transformed training image, and the training image before being transformed.

BRIEF DESCRIPTION OF DRAWINGS

The above and other aspects and features of the present disclosure will become more apparent by describing in detail exemplary embodiments thereof referring to the attached drawings, in which.

DETAILED DESCRIPTION OF THE EMBODIMENTS

Figure 1:
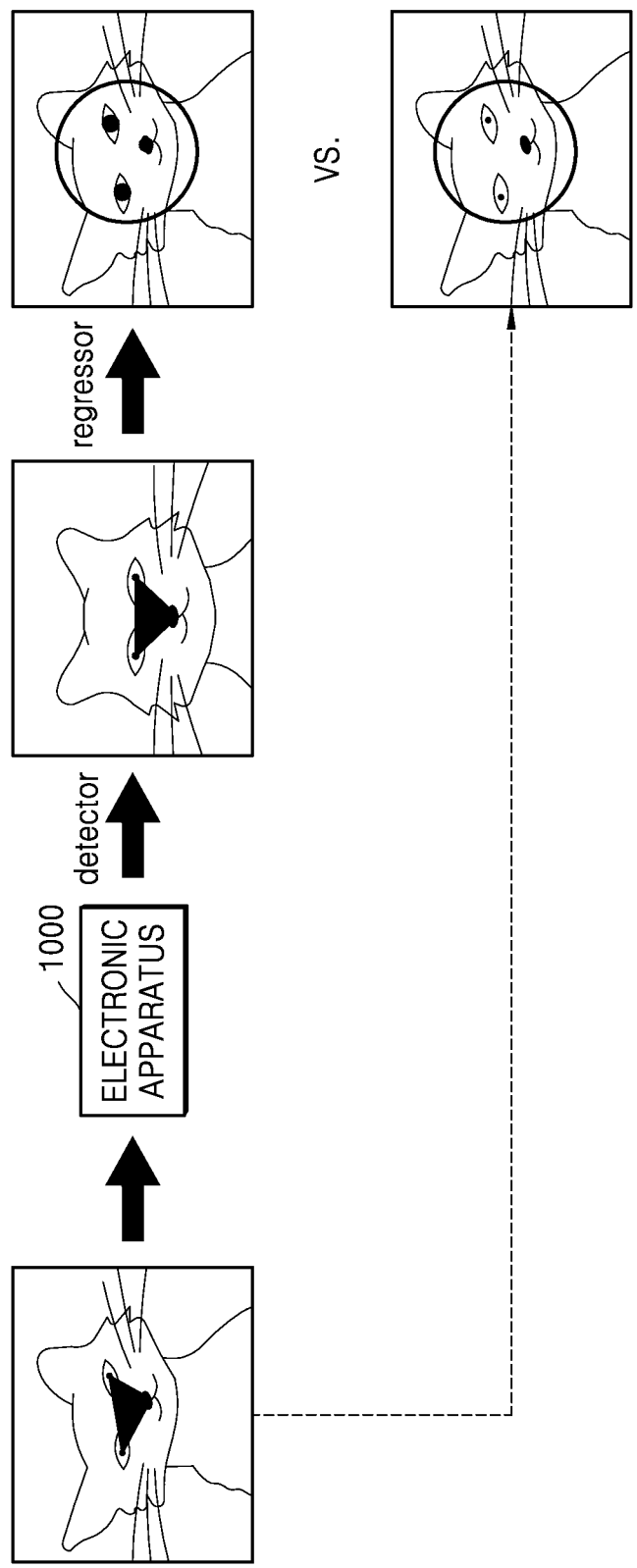
FIG. 1 is a schematic diagram of a system for processing images, according to some embodiments.

Hereinafter, the disclosure will be described in detail by explaining example embodiments of the disclosure with reference to the attached drawings. The disclosure may, however, be embodied in many different forms and should not be construed as being limited to the example embodiments set forth herein. In the drawings, parts not related to the disclosure are not illustrated for clarity of explanation, and like reference numerals denote like elements throughout.

Throughout the specification, when an element is referred to as being "connected to" another element, the element can be "directly connected to" the other element or be "electrically connected to" the other element via an intervening element. The terms "comprises", "comprising", "includes" and/or "including", when used herein, specify the presence of stated elements, but do not preclude the presence or addition of one or more other elements.

As used herein, a target object may refer to not only a person but also any of various types of objects including faces, e.g., an animal, a character, or an emoticon. For example, a dog and a cat may be different target objects, and a dog emoticon and a cat emoticon may also be different target objects.

According to an example embodiment of the disclosure, an artificial intelligence (AI) model for extracting a face of a target object from a certain image is provided. In this case, images corresponding to a plurality of types of target objects used to generate the AI model are referred to as 'training images'. An image including a target object different from target objects included in pre-trained images, and applied to the generated AI model to extract a face of the different target object therefrom is referred to as a 'target image'.

As used herein, an AI model may be a learning model trained using, as an AI algorithm, at least one of machine learning, neural networks, genes, deep learning, and a classification algorithm.

Hereinafter, the disclosure will be described in detail with reference to the attached drawings.

FIG. 1 is a schematic diagram of a system for processing images, according to some example embodiments.

Referring to FIG. 1, an electronic apparatus 1000 may provide a system for processing images to recognize a face of a target object included in the images. In this case, the electronic apparatus 1000 may be a server, but is not limited thereto. As such, according to another example embodiment, the electronic apparatus 1000 may be an electronic device capable of processing images.

The electronic apparatus 1000 may generate an AI model for recognizing a face of a target object in a training image, by using a plurality of training image sets corresponding to a plurality of types of target objects. For example, feature points forming a preset structure may be labeled on training images, and the electronic apparatus 1000 may determine a standard structure based on the labeled feature points.

For example, faces of the plurality of types of target objects may commonly include eyes and a nose and that the eyes and the nose of the target object may form a triangular structure. Accordingly, the electronic apparatus 1000 may generate an AI model for determining a standard structure and verifying the determined standard structure. That is, the electronic apparatus 1000 may determine the standard structure regardless of target object types by using the training images corresponding to the plurality of types of target objects. The electronic apparatus 1000 may identify a face of a target object by transforming a training image based on the standard structure.

The electronic apparatus 1000 may verify the generated AI model by regressing the training image from the transformed training image and comparing the regressed training image with the training image before being transformed. For example, when the transformed training image is regressed, the electronic apparatus 1000 may determine whether the standard structure is determined properly, based on whether a difference between the regressed training image and the training image is greater than a threshold value.

The electronic apparatus 1000 may receive, from an external device, a target image corresponding to a target object of a type different from the plurality of types of target objects included in the training image sets used to generate the AI model. The electronic apparatus 1000 may transform the target image to the standard structure, extract a face of the different target object from the transformed target image, and verify the extracted face, by inputting the target image to the AI model.

Figure 2:
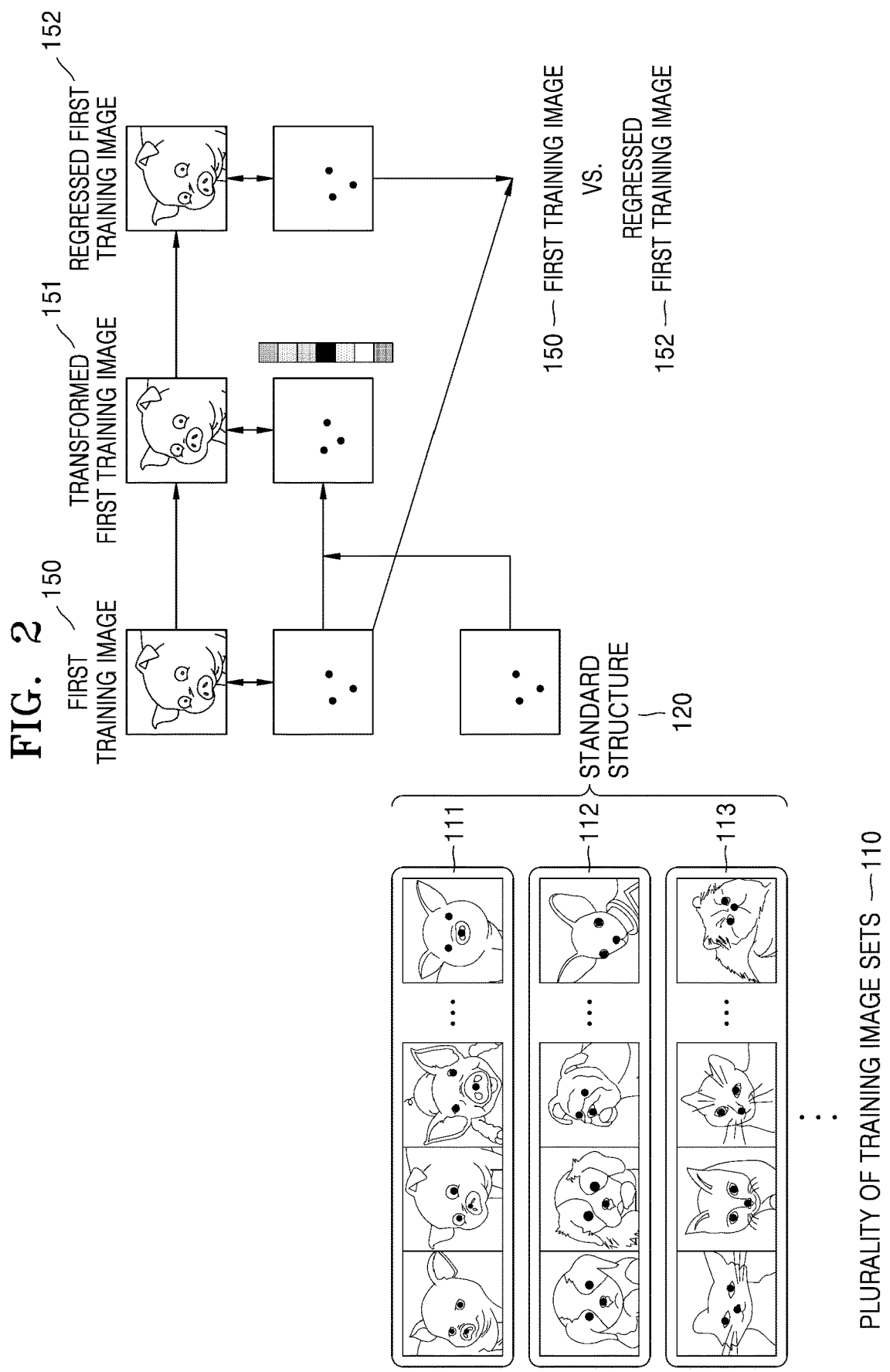
FIG. 2 is a schematic diagram for describing a method of generating an artificial intelligence (AI) model for recognizing a face of a target object in a training image according to some embodiments.

FIG. 2 is a schematic diagram of a system 100 for generating an AI model for recognizing a face of a target object in a training image, according to some example embodiments.

According to an example embodiment, the electronic apparatus 1000 may obtain a plurality of training image sets 110 corresponding to a plurality of types of target objects, to generate an AI model for recognizing a face of a target object. Referring to FIG. 2, the electronic apparatus 1000 may obtain, for example, a pig image set 111, a dog image set 112, and a cat image set 113 corresponding to pigs, dogs, and cats, as the training image sets 110. For convenience of explanation, the following description assumes that target objects included in obtained training image sets are 'pigs'. For example, the following operations will be described on the assumption of a first training image 150 in the pig image set 111, but may also be applied to not only pig training images different from the first training image 150 in the pig image set 111 but also all training images regardless of target object types.

Training images in the training image sets 110 may be labeled with feature points forming a structure. According to an example embodiment, the structure may be present. For example, a training image corresponding to each of the plurality of types of target objects may be labeled with feature points corresponding to a left eye, a right eye, and a nose of a target object, and the preset structure may be a triangular structure connecting the eyes and the nose of the target object in the training image. For example, the first training image 150 corresponding to a pig may be labeled with feature points forming a triangular structure corresponding to a left eye, a right eye, and a nose.

According to an example embodiment, the electronic apparatus 1000 may generate a first AI model for determining a standard structure 120 based on the labeled feature points, by using the training images in the plurality of training image sets 110. For example, the standard structure 120 may be determined based on the labeled feature points and a spatial transformer network (STN) function. The STN function may spatially transform an input image based on a transformation parameter θ. According to an example embodiment of the disclosure, the STN function corresponds to the following Equation 1 and the electronic apparatus 1000 may determine the standard structure 120 based on the labeled feature points in the training image by using Equation 1.

[Equation 1]
$$\Delta_i = \frac{1}{K}\sum_{j=1}^{K} y_i^{(j)}.$$

Referring to Equation 1, input $y_i^{(j)}$ may represent the labeled feature points in the training image. For example, the input $y_i^{(j)}$ may be a coordinate or a vector of the labeled feature points in the training image, but is not limited thereto and may be provided in any form capable of representing the labeled feature points. The electronic apparatus 1000 may determine the standard structure 120 based on a mean value of the input $y_i^{(j)}$. For example, the electronic apparatus 1000 may determine the standard structure 120 of the feature points included in the training images in the plurality of training image sets 110, based on an output value $\Delta_i$ of the STN function.

Meanwhile, the electronic apparatus 1000 may learn the standard structure 120 in such a manner that a difference between the standard structure 120 determined by Equation 1 and a structure $g_{stn}(y_i^{(j)})$ output when $y_i^{(j)}$ corresponding to the labeled feature points of the training image is input to a STN function $g_{STN}$ is less than or equal to a certain threshold value. For example, the electronic apparatus 1000 may calculate, by using Equation 2, a difference $MAE(\Delta_i - g^{stn}(y_i^{(j)}))$, between the standard structure 120 and the structure $g_{stn}(y_i^{(j)})$ output when $y_i^{(j)}$ corresponding to the labeled feature points of the training image is input to the STN function, and learn to minimize the mean absolute error (MAE) value.

[Equation 2]
$$\mathcal{L}_{tri,i}^{(j)} = MAE(\Delta_i - g_{stn}(y_i^{(j)}))) \quad \text{[Equation 2]}$$

According to an example embodiment of the disclosure, the electronic apparatus 1000 may transform the first training image 150 based on the standard structure 120 determined using the STN function. The electronic apparatus 1000 may identify a face of a pig that is the target object, in the transformed first training image 151. Although the transformed first training image 151 is represented in the form of an image for convenience of explanation, a coordinate, a vector, or a function of the transformed first training image 151 may be actually obtained.

According to an example embodiment of the disclosure, the electronic apparatus 1000 may train a second AI model for verifying the first AI model, by comparing a first training image 152 regressed from the transformed first training image 151, with the first training image 150 before being transformed. For example, the electronic apparatus 1000 may regress the first training image 151 transformed based on the standard structure 120, and verify the first AI model, based on a difference between the regressed first training image 152 and the first training image 150 before being transformed. In this case, the electronic apparatus 1000 may use Equation 3 to obtain the difference between the regressed first training image 152 and the first training image 150.

[Example 3]
$$\mathcal{L}_{reg,i}^{(j)} = MAE(y_i^{(j)} - g_{stn}^{-1}(g_{reg}(g_{stn}(x_i^{(j)})))) \quad \text{[Equation 3]}$$

Referring to Equation 3, the electronic apparatus 1000 may regress the transformed first training image 151 by using a regression function $g_{reg}$ and an inverse STN function $g_{STN}^{-1}$. The electronic apparatus 1000 may calculate the difference between the first training image 152 regressed using the regression function $g_{reg}$ and the inverse STN function $g_{STN}^{-1}$, and the first training image 150 before being transformed. In this case, the electronic apparatus 1000 may verify the first AI model based on whether the calculated $\mathcal{L}_{reg,i}^{(j)}$, value is less than or equal to a certain threshold value. A method of verifying the first AI model will be described below.

According to an example embodiment, after the first training image 150 is transformed by the STN function $g_{STN}$, when the transformed first training image 151 passes through the regression function $g_{reg}$, the electronic apparatus 1000 may infer a coordinate of feature points corresponding to the eyes and the nose. The electronic apparatus 1000 may regress the inferred feature points corresponding to the eyes and the nose, by using the inverse STN function $g_{STN}^{-1}$, and then compare the same with $y_i^{(j)}$ corresponding to the labeled feature points of the training image.

Figure 3:
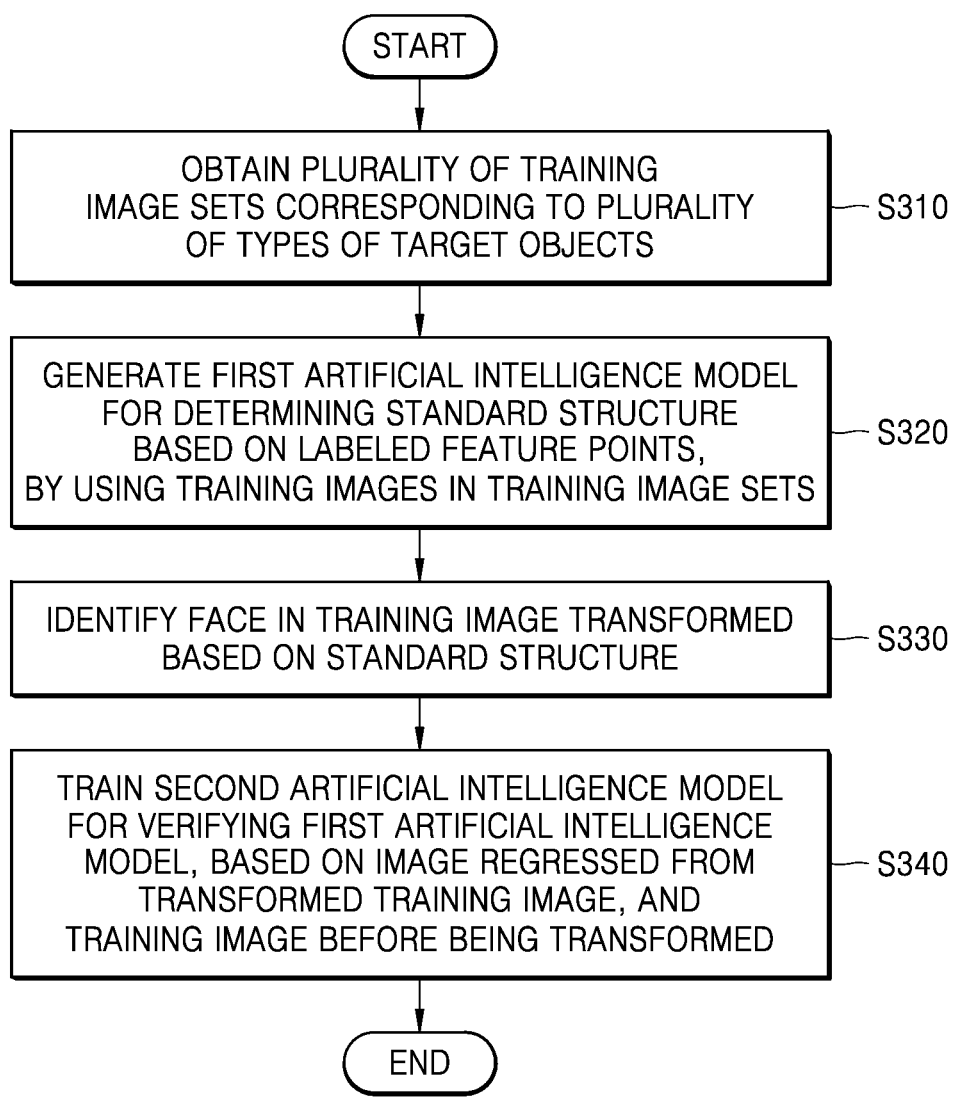
FIG. 3 is a flowchart of a method, performed by an electronic apparatus, of processing images to recognize a face of a target object in a training image, according to some embodiments.

FIG. 3 is a flowchart of a method, performed by the electronic apparatus 1000, of processing images to recognize a face of a target object in a training image, according to some example embodiments.

In operation S310, the electronic apparatus 1000 may obtain a plurality of training image sets corresponding to a plurality of types of target objects. Training images in the training image sets may be labeled with feature points forming a preset structure. The preset structure may be a triangular structure connecting eyes and a nose of a target object in a training image.

In operation S320, the electronic apparatus 1000 may generate a first AI model for determining a standard structure based on the labeled feature points, by using the training images in the training image sets. For example, the electronic apparatus 1000 may determine the standard structure based on the labeled feature points and a STN function. For example, the electronic apparatus 1000 may determine the standard structure based on mean values of the feature points in the training images, and learn the standard structure to minimize a difference between the input feature points and the determined standard structure, by using Equation 1and Equation 2 discussed above.

In operation S330, the electronic apparatus 1000 may identify a face in a training image transformed based on the standard structure. For example, when the training image is transformed based on the standard structure, the electronic apparatus 1000 may identify a face of a target object by determining points corresponding to the standard structure, as eyes and a nose of the target object.

In operation S340, the electronic apparatus 1000 may train a second AI model for verifying the first AI model, based on an image regressed from the transformed training image, and the training image before being transformed. For example, the electronic apparatus 1000 may regress the transformed training image, and verify the first AI model based on a difference between the regressed image and the training image. The electronic apparatus 1000 may verify the first AI model by using the second AI model, and update the first AI model to change the standard structure, based on the verification result. For example, the electronic apparatus 1000 may train the first AI model in such a manner that the difference between the regressed image and the training image is less than or equal to a preset threshold value, based on the verification result.

Figure 4:
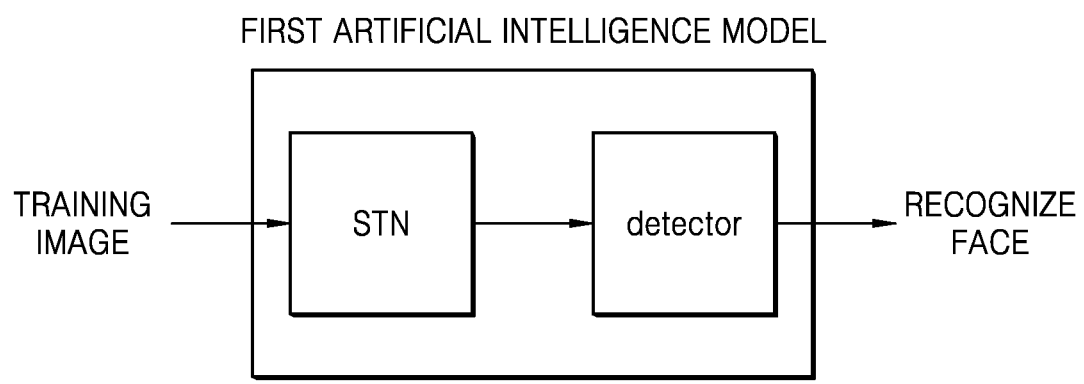
FIG. 4 is a diagram illustrating a first AI model according to some example embodiments.

FIG. 4 is a diagram illustrating a first AI model according to some example embodiments.

The first AI model is a learning model for recognizing a face of a target object, based on a standard structure formed by labeled feature points in training images. Referring to FIG. 4, when a training image is input to the first AI model, the electronic apparatus 1000 may transform the training image to the standard structure based on a STN function. The electronic apparatus 1000 may recognize a face included in the training image, by extracting feature points corresponding to the standard structure, from the transformed training image by using a detector. Although the STN and the detector are illustrated as separate elements for convenience of explanation, the electronic apparatus 1000 may also recognize a face of a target object based on points corresponding to the standard structure of the STN-transformed training image when the training image is STN-transformed.

Figure 5:
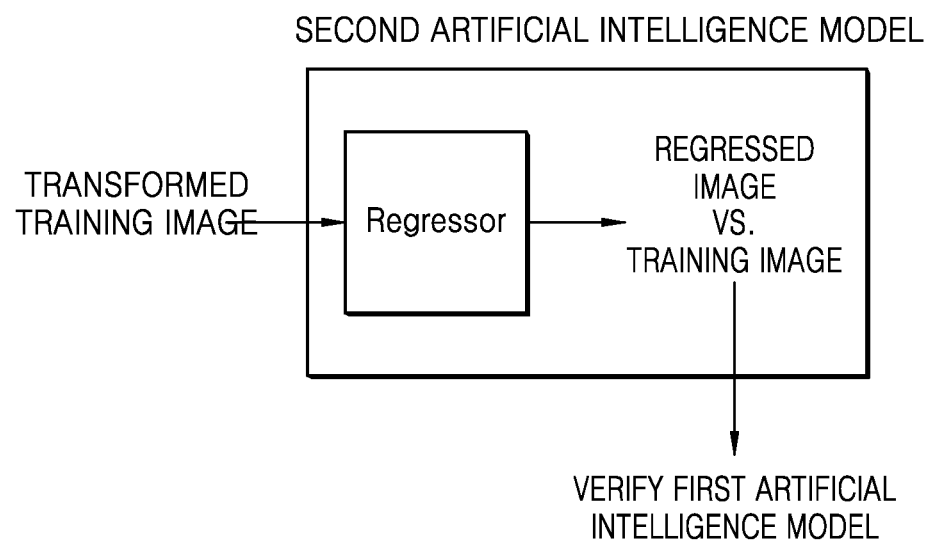
FIG. 5 is a diagram illustrating a second AI model according to some example embodiments.

FIG. 5 is a diagram illustrating a second AI model according to some example embodiments.

The second AI model is a learning model for verifying the first AI model. For example, referring to FIG. 5, when the transformed training image is input to the second AI model, the electronic apparatus 1000 may regress the transformed training image by using a regressor, and verify the first AI model by comparing the regressed image with the training image before being transformed. For example, the electronic apparatus 1000 may regress the transformed training image based on a regression function and an inverse STN function, and determine that the first AI model is verified, when a difference between the regressed image and the training image is less than or equal to a certain threshold value.

Meanwhile, the electronic apparatus 1000 may determine that the first AI model is not verified, when the difference between the regressed image and the training image is greater than the certain threshold value. For example, the case in which the first AI model is determined as being not verified may include a case in which the standard structure determined by the first AI model has an error or a case in which the determined standard structure has no error but the training image is transformed improperly, but is not limited thereto. That is, the electronic apparatus 1000 may verify the first AI model based on whether the difference between the regressed image and the training image is less than or equal to the certain threshold value, and control the difference between the regressed image and the training image to be less than or equal to the certain threshold value. According to an example embodiment, the electronic apparatus 1000 may control the difference between the regressed image and the training image to be less than or equal to the certain threshold value by changing the determined standard structure based on the verification result or by re-transforming the training image based on the standard structure. For example, the electronic apparatus 1000 may verify the first AI model by using the second AI model, and update the first AI model to change the standard structure, based on the verification result.

Figure 6:
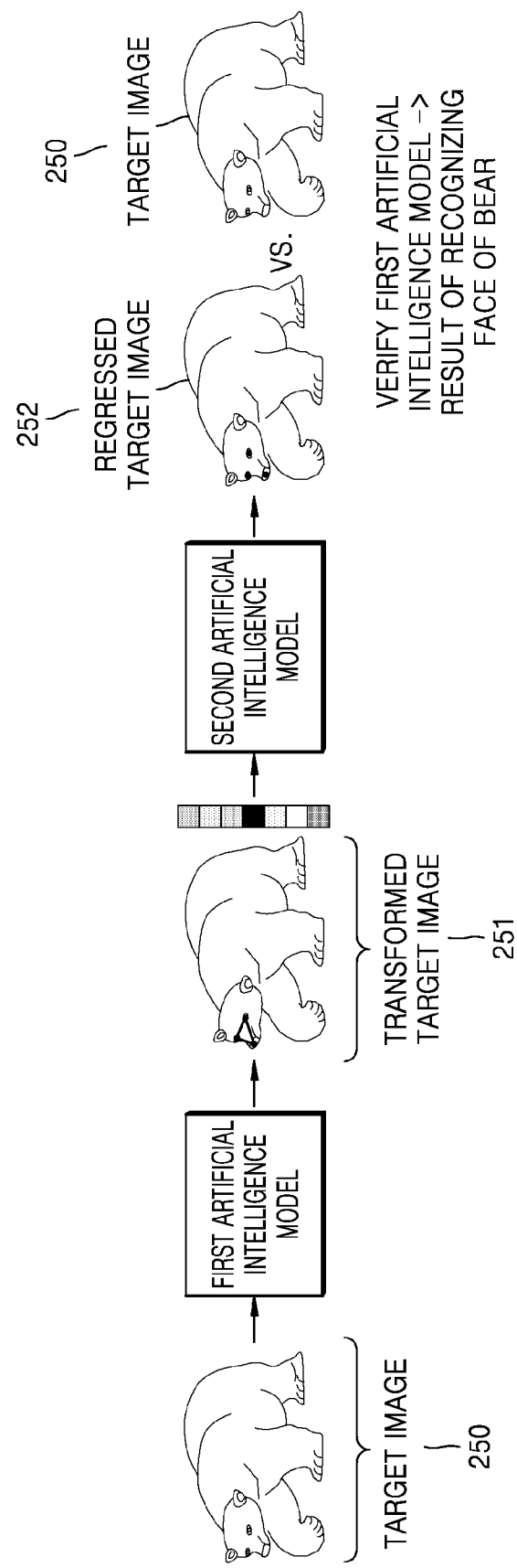
FIG. 6 is a schematic diagram of a system for extracting a face of a target object included in a target image, by applying the target image to an AI model, according to some example embodiments.

FIG. 6 is a schematic diagram of a system for extracting a face of a target object included in a target image, by applying the target image to an AI model, according to some example embodiments.

Referring to FIG. 6, the electronic apparatus 1000 may obtain a target image 250 including a target object of a type different from target objects included in training image sets for generating an AI model. The target image 250 may include one or more target images. For example, the electronic apparatus 1000 may apply few-shot adaptation to the target image 250 by using a standard structure determined by a first AI model. As such, when the electronic apparatus 1000 extracts a face from the target image 250 including a target object of a type different from target objects of training images, the number of required target image 250 may be less than or equal to a certain number. That is, the electronic apparatus 1000 may extract the face of the target object of the type different from the target objects included in the training images, by using the certain or less number of target images 250. For example, although the training images do not include a target object such as a 'bear', the electronic apparatus 1000 may extract a face of the target object such as the 'bear' by applying the target image 250 to the AI model generated using the training images including different target objects such as pigs, dogs, and cats.

According to an example embodiment of the disclosure, the electronic apparatus 1000 may transform the target image 250 in such a manner that feature points in the target image 250 form the standard structure, by inputting the obtained target image 250 to the first AI model.

The electronic apparatus 1000 may extract the face of the target object based on the transformed target image 251. For example, feature points in the transformed target image 251 may be inferred using the target object in the target image 250. For example, the electronic apparatus 1000 may extract the face of the target object by determining the feature points corresponding to the standard structure in the transformed target image 251 as eyes and a nose of the target object.

According to an example embodiment of the disclosure, the electronic apparatus 1000 may verify the face extracted by the first AI model, by inputting the transformed target image 251 and the target image 250 before being transformed to a second AI model. For example, the electronic apparatus 1000 may input the transformed target image 251 to the second AI model for verifying the extracted face by comparing a target image 252 regressed from the transformed target image 251, with the target image 250 before being transformed.

According to an example embodiment of the disclosure, the electronic apparatus 1000 may regress the transformed target image 251 and extract the face of the target object from the regressed target image 252, by inputting the transformed target image 251 to the second AI model. In this case, the electronic apparatus 1000 may verify the face extracted from the regressed target image 252, by comparing the regressed target image 252 with the target image 250. For example, when a difference between the regressed target image 252 and the target image 250 is less than or equal to a certain threshold value, the electronic apparatus 1000 may determine the face extracted from the regressed target image 252, as the face of the target object.

Figure 7:
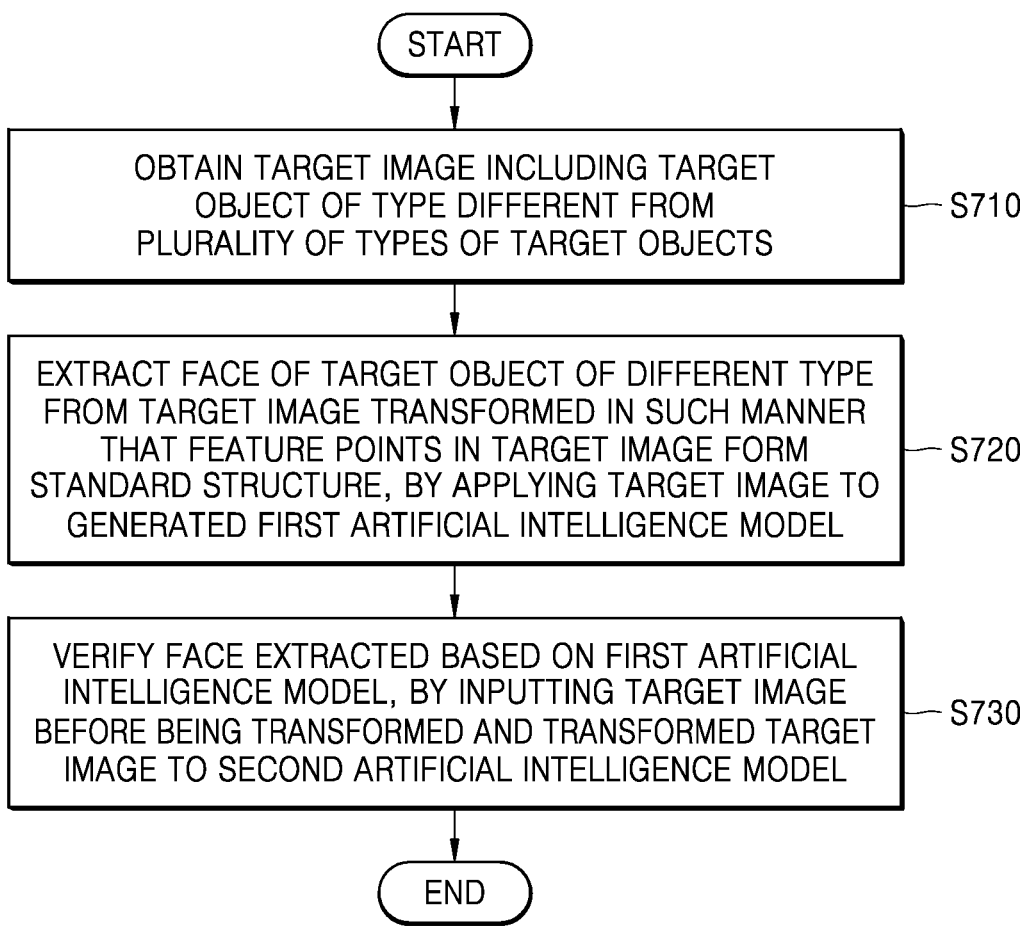
FIG. 7 is a flowchart of a method, performed by an electronic apparatus, of processing images to recognize a face of a target object in a target image, according to some example embodiments.

FIG. 7 is a flowchart of a method, performed by the electronic apparatus 1000, of processing images to recognize a face of a target object in a target image, according to some example embodiments.

In operation S710, the electronic apparatus 1000 may obtain a target image including a target object of a type different from a plurality of types of target objects. The electronic apparatus 1000 may extract a face of the target object in the target image including the target object of the type different from the plurality of types of target objects included in training images.

In operation S720, the electronic apparatus 1000 may extract the face of the target object of the different type from the target image transformed in such a manner that feature points in the target image form a standard structure, by applying the target image to a generated first AI model. For example, the electronic apparatus 1000 may determine the face of the different target object based on feature points corresponding to the standard structure from among the feature points in the transformed target image.

In operation S730, the electronic apparatus 1000 may verify the face extracted based on the first AI model, by inputting the target image before being transformed and the transformed target image to a second AI model. For example, the electronic apparatus 1000 may verify the face extracted based on the first AI model, by regressing the transformed target image, extracting the face of the target object of the different type from the regressed target image, and comparing the regressed target image with the target image before being transformed.

Figure 8:
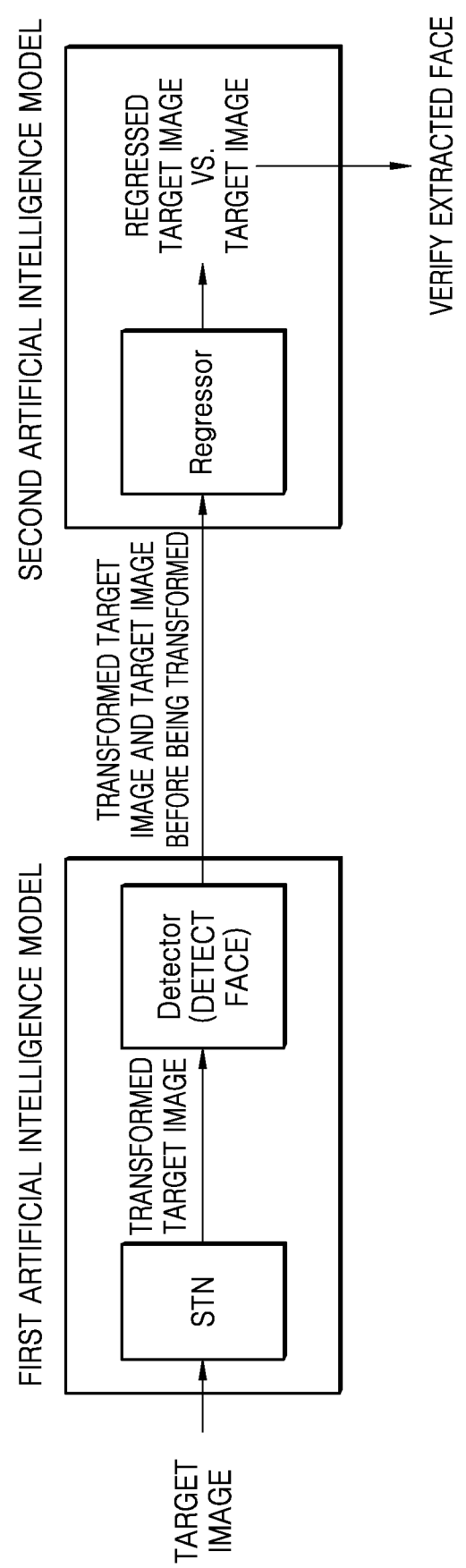
FIG. 8 is a diagram for describing a method of extracting a face of a target object by applying a target image to an AI model, according to some example embodiments.

FIG. 8 is a diagram for describing a method of extracting a face of a target object by applying a target image to an AI model, according to some example embodiments.

Referring to FIG. 8, the electronic apparatus 1000 may input a target image to a first AI model pre-generated based on training images. For example, when the target image is input to the first AI model, the electronic apparatus 1000 may transform the input target image by using a STN function, and extract a face of a target object included in the target image, based on the transformed target image by using a detector. Although the STN and the detector are illustrated as separate elements for convenience of explanation, feature points corresponding to the face of the target object may also be extracted when the STN function is applied. Meanwhile, the electronic apparatus 1000 may update the first AI model based on the feature points extracted from the target image. For example, the electronic apparatus 1000 may update a determined standard structure based on a structure formed by the feature points in the target image.

According to an embodiment of the disclosure, the electronic apparatus 1000 may input the transformed target image and the target image before being transformed, to a second AI model. For example, the electronic apparatus 1000 may regress the transformed target image by using a regressor. The electronic apparatus 1000 may verify the face of the target object extracted from the target image based on the first AI model, based on whether a difference between the regressed target image and the target image before being transformed is less than or equal to a certain threshold value. When the difference between the regressed target image and the target image before being transformed is greater than the certain threshold value, the electronic apparatus 1000 may change the pre-generated first AI model. For example, the electronic apparatus 1000 may change the determined standard structure based on the obtained feature points in the target image, or re-transform the target image based on the determined standard structure.

Figure 9:
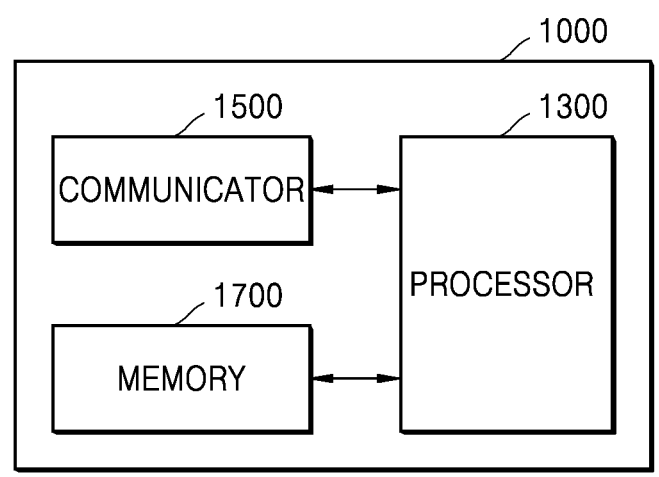
FIG. 9 is a block diagram of an electronic apparatus according to some example embodiments.

FIG. 9 is a block diagram of the electronic apparatus 1000 according to some example embodiments.

As illustrated in FIG. 9, the electronic apparatus 1000 according to some embodiments may include a communicator 1500, a memory 1700 storing one or more instructions, and a processor 1300 executing the one or more instructions to control the electronic apparatus 1000. However, not all elements illustrated in FIG. 9 are essential elements of the electronic apparatus 1000. The electronic apparatus 1000 may include a larger or smaller number of elements compared to those illustrated in FIG. 9.

The processor 1300 generally controls overall operations of the electronic apparatus 1000. For example, the processor 1300 may control operations of the electronic apparatus 1000 by executing programs stored in the memory 1700.

According to an example embodiment, the processor 1300 may receive an image via the communicator 1500 from a device 2000. For example, the processor 1300 may control to process the image received from the device 2000 and extract a face of a target object included in the received image.

According to an example embodiment, the processor 1300 may obtain a plurality of training image sets corresponding to a plurality of types of target objects, wherein training images in the training image sets are labeled with feature points forming a preset structure, generate a first AI model for determining a standard structure based on the labeled feature points, by using the training images in the training image sets, identify a face in a training image transformed based on the standard structure, and train a second AI model for verifying the first AI model, based on an image regressed from the transformed training image, and the training image before being transformed.

The processor 1300 may determine the standard structure based on the labeled feature points and a spatial STN function. The processor 1300 may generate the transformed training image by transforming the training image in such a manner that the feature points in the training image form the standard structure.

According to an example embodiment, the processor 1300 may obtain a target image including a target object of a type different from the plurality of types of target objects, extract a face of the target object of the different type from the target image transformed in such a manner that feature points in the target image form the standard structure, by applying the target image to the generated first AI model, and verify the face extracted based on the first AI model, by inputting the target image before being transformed and the transformed target image to the second AI model.

For example, the processor 1300 may receive, via the communicator 1500, a small number of target images including the target object different from those included in the plurality of training image sets corresponding to the plurality of types of target objects. The processor 1300 may transform the target image to the standard structure and extract the face of the different target object based on the transformed target image, based on the pre-generated first and second AI models. That is, when the standard structure is used, the processor 1300 may extract the face of the target object included in the target image by using only a small number of images, and thus data efficiency and face recognition speed may be increased.

The communicator 1500 may include one or more elements for communicating with an external device to receive the target image or the training images. The communicator 1500 may transmit the face recognition result to the external device. The communicator 1500 may include a short-range wireless communicator, a mobile communicator, etc., but is not limited thereto.

The memory 1700 may store programs for processing and controlling operations of the processor 1300, and also store data input to or to be output from the electronic apparatus 1000.

The memory 1700 may include at least one type of storage medium from among flash memory, a hard disk, a multimedia card micro, a memory card (e.g., a secure digital (SD) or extreme digital (XD) card), random access memory (RAM), static RAM (SRAM), read-only memory (ROM), electrically erasable programmable ROM (EEPROM), programmable ROM (PROM), magnetic memory, a magnetic disc, and an optical disc.

Figure 10:
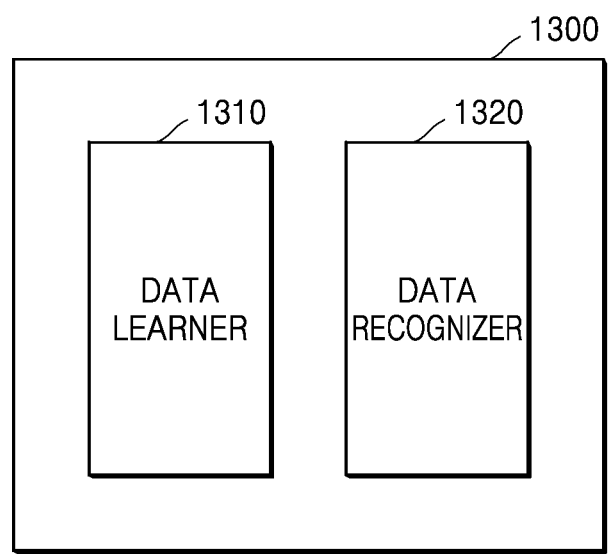
FIG. 10 is a block diagram of a processor according to some example embodiments.

FIG. 10 is a block diagram of the processor 1300 according to some example embodiments.

Referring to FIG. 10, the processor 1300 according to some example embodiments may include a data learner 1310 and a data recognizer 1320.

The data learner 1310 may learn a criterion for determining a standard structure in training images. The data learner 1310 may learn a criterion about which data to be used to determine the standard structure and how to transform a training image by using the data. For example, the data learner 1310 may use feature points labeled on the training images. The data learner 1310 may learn a criterion for identifying a face of a target object based on feature points corresponding to the standard structure, by determining the standard structure formed by the feature points based on the labeled feature points, and transforming the training image based on the standard structure.

The data learner 1310 may obtain the transformed training image by applying the determined standard structure to the training image, and verify the standard structure based on the transformed training image. For example, the data learner 1310 may learn a criterion for verifying the standard structure, by regressing the transformed training image and comparing the regressed training image with the training image before being transformed.

For example, the data learner 1310 may obtain the training images for determining the standard structure. For example, the data learner 1310 may obtain training image sets corresponding to a plurality of types of target objects, as described above in relation to FIGS. 1 and 2, but the disclosure is not limited to the example embodiment described above in relation to FIGS. 1 and 2.

The data learner 1310 may preprocess the obtained data to extract face recognition data from the obtained training image. The data learner 1310 may process the obtained data to a format to use a triangular structure connecting eyes and a nose of the target object in the training image. The format may be a present format.

The data learner 1310 may select training data from the preprocessed data. For example, the data learner 1310 may select the training data from the preprocessed data according to a preset criterion.

The data learner 1310 may learn a criterion for transforming the training image to the standard structure based on the training data. The data learner 1310 may learn a criterion about which training data to be used.

The data learner 1310 may train a first AI model and a second AI model based on a fact that the training images are labeled with feature points forming a preset structure. In the following description, for convenience of explanation, the first and second AI models are collectively referred to as an AI model.

Alternatively, the data learner 1310 may generate an AI model and train the generated AI model. The AI model may be a learning model for few-shot adaptation.

The AI model may be constructed considering an application field of a recognition model, a purpose of learning, computing performance of an apparatus, or the like. The AI model may be, for example, a model based on a neural network. For example, the AI model may use a deep neural network (DNN), a recurrent neural network (RNN), or a bidirectional recurrent deep neural network (BRDNN), but is not limited thereto.

According to various example embodiments, when a plurality of pre-constructed AI models are present, the data learner 1310 may determine, as the AI model to be trained, an AI model related to the input training images and the training data.

The data learner 1310 may train the AI model by using, for example, a leaning algorithm such as error back-propagation or gradient descent.

The data learner 1310 may train the AI model through, for example, supervised learning using training data as an input value. The data learner 1310 may train the AI model through, for example, unsupervised learning for finding a criterion for making a decision, by autonomously learning the type of data required to make the decision. The data learner 1310 may train the AI model through, for example, reinforcement learning using a feedback on whether a result of a decision made through learning is correct.

When the AI model is trained, the data learner 1310 may store the trained AI model. In this case, the data learner 1310 may store the trained AI model in a memory of the electronic apparatus 1000 including the data recognizer 1320 to be described below. Alternatively, the data learner 1310 may store the trained AI model in a memory of a server connected to the electronic apparatus 1000 via a wired or wireless network.

In this case, the memory storing the trained AI model may also store, for example, commands or data related to at least one other element of the electronic apparatus 1000. The memory may store software and/or programs. The programs may include, for example, a kernel, middleware, application programming interfaces (APIs), and/or application programs (or "applications").

The data learner 1310 may input the regressed training image and the training image before being transformed, to the second AI model, and determine that the first AI model is not verified, when a difference between the regressed training image and the training image before being transformed does not satisfy a certain criterion. In this case, the data learner 1310 may re-train the first AI model.

For example, when the number or a rate of pieces of training data for which the trained AI model outputs incorrect recognition results exceeds a preset threshold value, the data learner 1310 may determine that the certain criterion is not satisfied. For example, when the certain criterion is defined as a rate of 2%, and when the trained AI model outputs incorrect recognition results for more than 20 pieces of training data out of a total of 1,000 pieces of training data, the data learner 1310 may determine that the trained AI model is not proper.

Meanwhile, the data learner 1310 may be produced in the form of at least one hardware chip and be mounted in an electronic apparatus. For example, the data learner 1310 may be produced in the form of a dedicated hardware chip for AI or as a part of a general-purpose processor (e.g., a central processing unit (CPU) or an application processor) or a dedicated graphics processor (e.g., a graphics processing unit (GPU)), and be mounted in various electronic apparatuses.

The data learner 1310 may be implemented as a software module. When the data learner 1310 is implemented as a software module (or a program module including instructions), the software module may be stored in non-transitory computer-readable media. In this case, the at least one software module may be provided by an operating system (OS) or by a certain application. Alternatively, a part of the at least one software module may be provided by an OS and the other part may be provided by a certain application.

The data recognizer 1320 may use the first AI model to extract a face of a different target object from a target image. The data recognizer 1320 may transform the target image based on the standard structure by inputting the target image to the first AI model. In this case, the data recognizer 1320 may extract the face of the target object from the transformed target image based on feature points corresponding to the standard structure. The data recognizer 1320 may obtain feature points corresponding to eyes and a nose of the target object according to a criterion preset through learning, and provide, as output data, the face of the target object, which is extracted from the transformed target image based on the obtained feature points. The data recognizer 1320 may verify the extracted face based on a difference between a regressed target image and the target image before being transformed, by inputting the transformed target image and the target image before being transformed, to the second AI model.

The data recognizer 1320 may obtain data related to the feature points labeled on the target image, and process the obtained data. The data recognizer 1320 may process the obtained data to a preset format to use the data related to the feature points included in the target image. The data recognizer 1320 may obtain, for example, the data described above in relation to FIGS. 6 to 8, but the disclosure is not limited thereto.

The data recognizer 1320 may select required data from the preprocessed data. The selected data may be provided to the data learner 1310. The data recognizer 1320 may select a part or the entirety of the preprocessed data according to a preset criterion. The data recognizer 1320 may select the data according to a criterion preset through learning.

The data recognizer 1320 may output data for extracting the face of the target object included in the target image, by applying the selected data to the AI model. The data recognizer 1320 may apply the selected data to the AI model by using the selected data as an input value. A recognition result may be determined by the AI model.

In this case, the AI model may include the first AI model for determining the standard structure based on the labeled feature points by using the training images in the training image sets, and the second AI model for verifying the first AI model by comparing the image regressed from the transformed training image, with the training image before being transformed.

The data recognizer 1320 may control the first AI model to be updated, based on an output result of the second AI model. For example, the data recognizer 1320 may control the data learner 1310 to update the first AI model, by providing a recognition result of the second AI model to the data learner 1310.

Meanwhile, the data recognizer 1320 may be produced in the form of at least one hardware chip and be mounted in the electronic apparatus 1000. For example, the data recognizer 1320 may be produced in the form of a dedicated hardware chip for AI or as a part of a general-purpose processor (e.g., a CPU or an application processor) or a dedicated graphics processor (e.g., a GPU), and be mounted in various electronic apparatuses. The data recognizer 1320 may be mounted in one electronic apparatus or in each of different electronic apparatuses.

The data recognizer 1320 may be implemented as a software module. When the data recognizer 1320 is implemented as a software module (or a program module including instructions), the software module may be stored in non-transitory computer-readable media. In this case, the at least one software module may be provided by an OS or by a certain application. Alternatively, a part of the at least one software module may be provided by an OS and the other part may be provided by a certain application.

At least one of the data learner 1310 and the data recognizer 1320 may be produced in the form of at least one hardware chip and be mounted in an electronic apparatus. For example, at least one of the data learner 1310 and the data recognizer 1320 may be produced in the form of a dedicated hardware chip for AI or as a part of a general-purpose processor (e.g., a CPU or an application processor) or a dedicated graphics processor (e.g., a GPU), and be mounted in various electronic apparatuses.

In this case, the data learner 1310 and the data recognizer 1320 may be mounted in one electronic apparatus or in each of different electronic apparatuses. For example, one of the data learner 1310 and the data recognizer 1320 may be included in an electronic apparatus, and the other may be included in a server. In a wired or wireless manner, model information constructed by the data learner 1310 may be provided to the data recognizer 1320, and data input to the data recognizer 1320 may be provided to the data learner 1310 as additional training data.

Meanwhile, at least one of the data learner 1310 and the data recognizer 1320 may be implemented as a software module. When at least one of the data learner 1310 and the data recognizer 1320 is implemented as a software module (or a program module including instructions), the software module may be stored in non-transitory computer-readable media. In this case, the at least one software module may be provided by an OS or by a certain application. Alternatively, a part of the at least one software module may be provided by an OS and the other part may be provided by a certain application.

Figure 11:
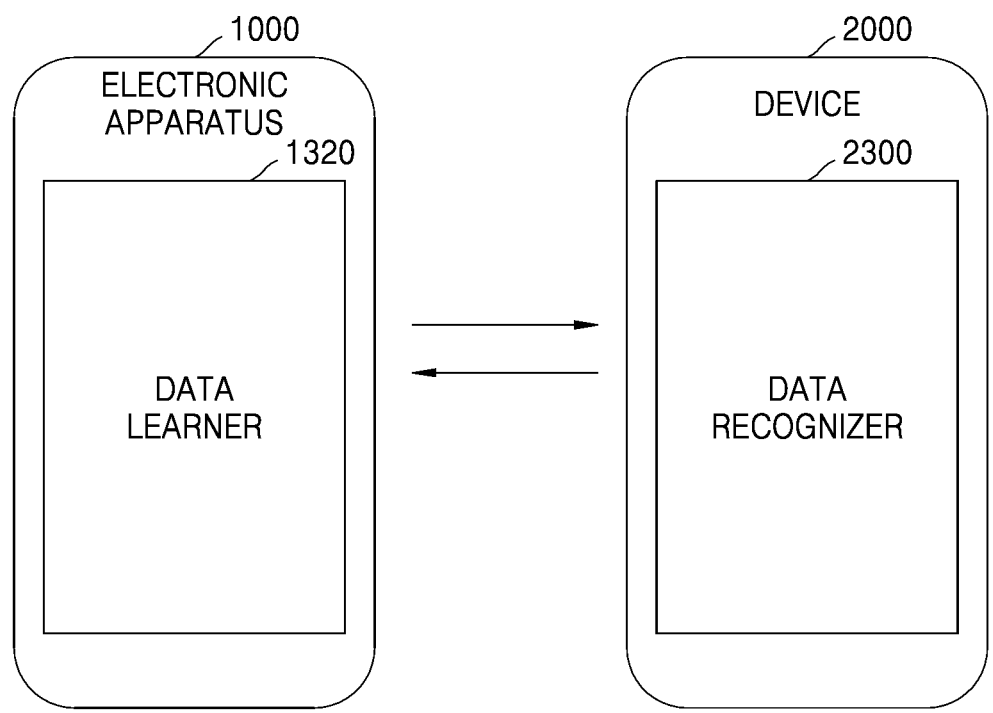
FIG. 11 is a diagram showing an example in which a device and an electronic apparatus according to some example embodiments cooperate to learn and recognize data.

FIG. 11 is a diagram showing an example in which a device 2000 and the electronic apparatus 1000 according to some example embodiments cooperate to learn and recognize data.

Referring to FIG. 11, a data learner 1310 may be included in the electronic apparatus 1000, and a data recognizer 2300 may be included in the device 2000. In this case, the electronic apparatus 1000 may be a server. However, the data learner 1310 and the data recognizer 2300 are not limited to the above-described example, and may be implemented in another form.

According to an example embodiment, since feature points forming a preset structure are labeled on obtained training images, the data learner 1310 may learn a criterion for transforming a training image to a standard structure to recognize a face. When a target image is selected by the device 2000, the data recognizer 2300 may extract a face of a different target object in the target image by using an AI model generated by the data learner 1310.

In this case, since feature points forming a preset structure are labeled on training images, the data learner 1310 of the electronic apparatus 1000 may learn a criterion for transforming a training image to a standard structure and recognizing a face of a target object. The data learner 1310 may obtain training data, and generate an AI model for identifying a face of a target object included in a training image, based on the obtained training data.

The data recognizer 2300 of the device 2000 may provide a result of applying the data selected as the target image to the AI model generated by the electronic apparatus 1000. For example, the data recognizer 2300 of the device 2000 may transmit the target image to the electronic apparatus 1000, and request the electronic apparatus 1000 to extract a face of a target object included in the target image, by applying the target image to the AI model. The data recognizer 2300 may receive information related to the extracted face of the target object from the electronic apparatus 1000.

Alternatively, the data recognizer 2300 of the device 2000 may receive the AI model generated by the electronic apparatus 1000, from the electronic apparatus 1000, and process the target image to extract the face from the target image by using the received AI model. Meanwhile, although the electronic apparatus 1000 and the device 2000 cooperate to extract the target object different from a plurality of types of target objects included in a plurality of training image sets, from the target image in FIG. 11, extraction of the target object is not limited thereto.

Some example embodiments may be implemented in the form of a recording medium including instructions executable by a computer, e.g., a program module executed by the computer. A computer-readable medium may be an arbitrary available medium that can be accessed by the computer, and examples thereof include all of volatile, non-volatile, detachable, and non-detachable media. The computer-readable medium may include a computer storage medium. Examples of the computer storage medium include all of volatile, non-volatile, detachable, and non-detachable media implemented using an arbitrary method or technology for storing information such as computer-readable instructions, data structures, program modules, or other data.

As used herein, the term "unit" may indicate a hardware component such as a processor or a circuit, and/or a software component executed by the hardware component such as the processor.

The above descriptions of the disclosure are provided for the purpose of illustration, and it will be understood by one of ordinary skill in the art that various changes in form and details may be made therein without departing from the scope of the disclosure. Therefore, it should be understood that the afore-described example embodiments should be considered in a descriptive sense only and not for purposes of limitation. For example, each component described to be of a single type can be implemented in a distributed manner and, likewise, components described as being distributed can be implemented in a combined manner.

The scope of the disclosure is defined by the following claims rather than by the detailed description, and it should be understood that all modifications from the claims and their equivalents are included in the scope of the disclosure.

The invention claimed is:

1. A method, performed by an electronic apparatus, of processing images, the method comprising:
   obtaining a plurality of training image sets corresponding to a plurality of types of target objects, wherein training images in the training image sets are labeled with feature points forming a preset structure;
   generating a first artificial intelligence (AI) model for determining a standard structure based on the labeled feature points, by using the training images in the training image sets;
   identifying a face in a training image transformed based on the standard structure; and
   training a second AI model for verifying the first AI model, based on an image regressed from the transformed training image, and the training image before being transformed.

2. The method of claim 1, wherein the second AI model regresses the transformed training image, and verifies the first AI model, based on a difference between the regressed training image and the training image before being transformed.

3. The method of claim 1, further comprising:
   verifying the first AI model by using the second AI model; and
   updating the first AI model to change the standard structure, based on a verification result.

4. The method of claim 1, wherein the preset structure is a triangular structure connecting eyes and a nose of a target object in the training image.

5. The method of claim 1, wherein the standard structure is determined based on the labeled feature points and a spatial transformer network (STN) function.

6. The method of claim 1, wherein the transformed training image is generated by transforming the training image in such a manner that the feature points in the training image form the standard structure.

7. The method of claim 1, further comprising:
obtaining a target image comprising a target object of a type different from the plurality of types of target objects;
extracting a face of the target object of the different type from the target image transformed in such a manner that feature points in the target image form the standard structure, by applying the target image to the generated first AI model; and
verifying the face extracted based on the first AI model, by inputting the target image before being transformed and the transformed target image to the second AI model.

8. The method of claim 1, wherein the first and second AI models are learning models trained using, as an AI algorithm, at least one of machine learning, neural networks, genes, deep learning, or a classification algorithm.

9. An electronic apparatus for processing images, the electronic apparatus comprising:
a communicator;
a memory storing one or more instructions; and
a processor configured to control the electronic apparatus by executing the one or more instructions,
wherein the processor is further configured to:
obtain a plurality of training image sets corresponding to a plurality of types of target objects, wherein training images in the training image sets are labeled with feature points forming a preset structure;
generate a first artificial intelligence (AI) model for determining a standard structure based on the labeled feature points, by using the training images in the training image sets;
identify a face in a training image transformed based on the standard structure; and
train a second AI model for verifying the first AI model, based on an image regressed from the transformed training image, and the training image before being transformed.

10. The electronic apparatus of claim 9, wherein the processor is further configured to regress the transformed training image, and verify the first AI model, based on a difference between the regressed training image and the training image before being transformed.

11. The electronic apparatus of claim 9, wherein the processor is further configured to:
verify the first AI model by using the second AI model; and
update the first AI model to change the standard structure, based on a verification result.

12. The electronic apparatus of claim 9, wherein the preset structure is a triangular structure connecting eyes and a nose of a target object in the training image.

13. The electronic apparatus of claim 9, wherein the standard structure is determined based on the labeled feature points and a spatial transformer network (STN) function.

14. The electronic apparatus of claim 9, wherein the transformed training image is generated by transforming the training image in such a manner that the feature points in the training image form the standard structure.

15. The electronic apparatus of claim 9, wherein the processor is further configured to:
obtain a target image comprising a target object of a type different from the plurality of types of target objects;
extract a face of the target object of the different type from the target image transformed in such a manner that feature points in the target image form the standard structure, by applying the target image to the generated first AI model; and
verify the face extracted based on the first AI model, by inputting the target image before being transformed and the transformed target image to the second AI model.

16. A non-transitory computer readable medium having stored thereon a program for performing a method of processing images comprising:
obtaining a plurality of training image sets corresponding to a plurality of types of first target objects, wherein a plurality of training images in the training image sets are labeled with feature points;
generating a first artificial intelligence (AI) model configured to determine a standard structure based on the labeled feature points, by using the plurality of training images in the training image sets;
transforming a first image, among the plurality of training images, into a second image based on the standard structure;
identifying a face in the second image; and
training a second AI model for verifying the first AI model, based on a third image generated by performing a regression operation on the second image, and the first image.

* * * * *